United States Patent Office 3,390,596
Patented July 2, 1968

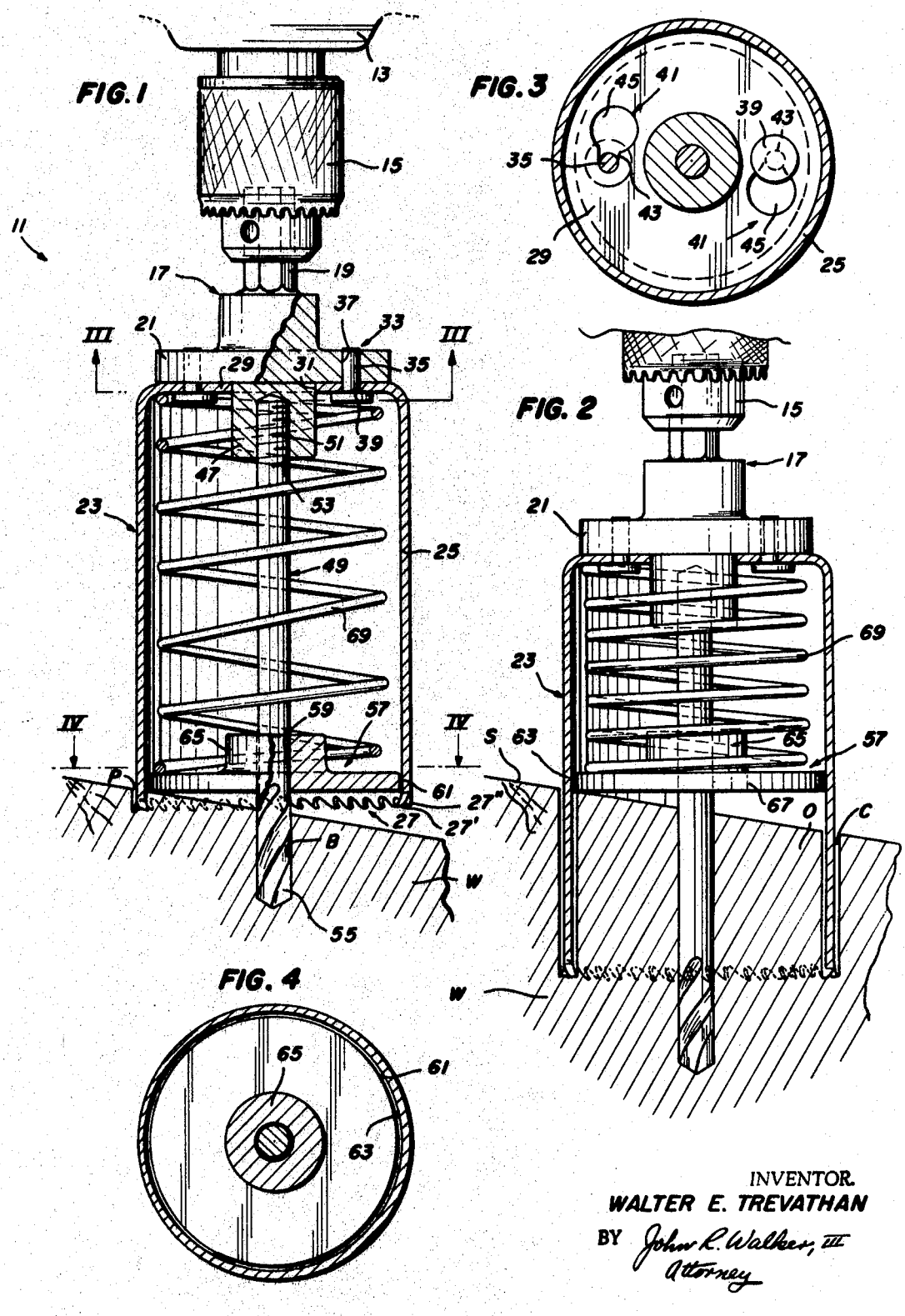

3,390,596
CUTTING HEAD ASSEMBLY
Walter E. Trevathan, McKenzie, Tenn., assignor to Trevathan Sales Corporation, a corporation of Tennessee
Filed Sept. 1, 1965, Ser. No. 484,312
7 Claims. (Cl. 77—69)

ABSTRACT OF THE DISCLOSURE

A cutting head assembly having a generally barrel-shaped cutting head including a cylindrical body portion open at the lower end thereof and having a plurality of cutting teeth around the lower circular edge thereof. A bit portion is attached to the cutting head and extends axially thereof for serving as a pilot or guide for the cutting head assembly. A spring actuated disc is movably mounted in the body portion with the peripheral edge of the disc being in position to be engaged by the body portion to prevent distortion thereof. Inwardly extending teeth limit the downward movement of the disc.

---

This invention relates to a cutting head assembly of the type which comprises in general a barrel-shaped cutting head including a cylindrical body portion open at the lower end thereof and having a plurality of cutting teeth around the lower circular edge thereof.

Cutting head assemblies of the above-mentioned type are driven about a longitudinal axis extending centrally of the cylindrical body portion and substantially perpendicular to the plane of the lower circular edge thereof. Among other things these cutting head assemblies are used for cutting holes in wood or the like, or for cutting the end of pipes or the like to fit the outside cylindrical surface of another piece of pipe or the like. This general type of cutting head has had problems due to the length of the cutting head and the desirability of having a relatively thin-walled cylindrical body portion to reduce the power that otherwise would be required to make a thick cut. One of the major problems in this type of head was the distortion of the cutting head particularly at the beginning of the cut, and especially when cuts at an angle were made. For example, when the circularly arranged teeth of the cutting head engaged the work piece, the forces on the cutting head caused the cutting head to spring into a substantially oval shape which in turn caused more power to be required and an inaccurate cut.

Thus, the principal object of the present invention is to provide means in such a cutting head for maintaining the circular disposition of the cutting teeth.

A further object is to provide means for bracing the cylindrical body portion of the cutting head.

A further object is to provide such means that includes a disc slidably mounted in the interior of the cylindrical body portion and in sliding engagement with the interior surface of the body portion.

A further object is to provide means for urging said disc downwardly towards the lower edge of the cylindrical body portion whereby when the cutting head assembly begins to cut the work piece the disc is adjacent the teeth to brace the teeth and cylindrical body portion, and as the work piece is being cut, the work piece moves the disc upwardly.

A further object is to provide means for guiding or supporting the cutting head.

A further object is to provide means for quickly and easily replacing the cutting head per se.

A further object is generally to improve the design and construction of cutting head assemblies.

The means by which the foregoing and other objects of the present invention are accomplished and the manner of their accomplishment will be readily understood from the following specification upon reference to the accompanying drawing in which:

FIG. 1 is a side elevational view of the cutting head assembly of the present invention shown in conjunction with a chuck and with portions of the cutting head assembly being broken away and sectionalized for purposes of illustration, and with the cutting head being shown during the initial phases of the cutting.

FIG. 2 is a view similar to FIG. 1 but showing the cutting operation during subsequent phases thereof.

FIG. 3 is a sectional view taken as on the line III—III of FIG. 1.

FIG. 4 is a sectional view taken as on the line IV—IV of FIG. 1.

Referring now to the drawings in which the various parts are indicated by numerals, the cutting head assembly 11 of the present invention is adapted to be rotatably driven about its longitudinal axis by any suitable means, as for example, by a suitable drill, only a portion of which is shown, and which has the usual chuck 15, that is rotatably driven by the motor, not shown, in the drill.

Cutting head assembly 11 comprises a shank 17 that extends longitudinally along the center line of cutting head assembly 11. Shank 17 has an upper part 19 which is reduced in cross section and which is adapted to fit into chuck 15 to turn therewith. A circular flange 21 is mounted on shank 17 and preferably integrally formed therewith with the shank extending axially and perpendicularly relative to the flange.

Cutting head assembly 11 additionally includes the cutting head 23 per se which is substantially barrel-shaped. Cutting head 23 preferably includes a hollow cylindrical body portion 25 open at the bottom or lower end thereof and provided with a plurality of cutting teeth 27 around the lower circular edge thereof. Cutting head 23 additionally includes a circular base 29 integrally formed at the upper end of body portion 25 and having a central aperture 31 therethrough. Cutting head 23 is preferably removably mounted on the lower face of flange 21 with the body portion 25 and cutting teeth 27 being concentric with the longitudinal axis of the cutting head assembly 11. The above-mentioned detachable mounting of the cutting head 23 and flange 21 is preferably constructed as follows:

A plurality of pins 33 (two of which are shown in the drawings although more may be provided if desired) are fixedly mounted in flange 21 as by extending the shank 35 of each pin into a vertical hole 37 through the flange 21 and securing it therein by suitable means. Each pin 33 is provided with an enlarged head 39 at the lower end thereof and spaced below the lower face of flange 21. A plurality of key-shaped holes 41 corresponding in number to pins 33 are provided through circular base 29. Each of the holes 41 has a narrow part 43 smaller in size than head 39 but fitting shank 35. In addition, each hole 41 includes an enlarged part 45 leading from narrower part 43 and which enlarged part is greater than the diameter of head 39. The holes 41 and pins 33 are arranged on an arc concentric with the longitudinal axis of cutting head assembly 11 so that in attaching cutting head 23 to flange 21 the enlarged parts 45 of holes 41 are placed in alignment with the corresponding heads 39, the circular base 29 is then moved upwardly against the lower face of flange 21 and the head 23 is rotated about its axis to move the shanks 35 into the narrow parts 43 of the holes 41 to lock the cutting head 23 in place. It will be noted that the narrow parts 43 are located in such a manner relative to the enlarged parts 45 that rotation of the cutting head assembly will cause the shanks 35 to be urged towards the ends of narrow parts 43 and towards locking engagement. In detaching cutting head 23 from flange 21 substantially the reverse of the above-described engagement procedure is carried out. Thus, the cutting head 23 is rotated oppositely from its normal driven rotational direction so that the heads 39 are aligned with the enlarged parts 45 whereby the cutting head 23 may be removed.

It will be noted that the portion 47 of shank 17 extends into the interior of cutting head 23 through the central aperture 31. An extension portion 49 of shank 17 extends from the other portion 47 of the shank centrally and axially through the body portion 25 and beyond the lower circular edge where the cutting teeth 27 are provided. Extension portion 49 is preferably detachably mounted on portion 47 as by providing the upper end of extension portion 49 with threads 51 which threadedly engage the threaded socket 53 provided centrally of the lower end of portion 47. Extension portion 49 in the particular application shown is provided with a threaded bit portion 55 adjacent the lower end thereof, but the threaded bit portion may be omitted and other forms provided for different applications, without departing from the spirit and scope of the present invention.

An important feature of the present invention resides in the disc 57 which is movably mounted in body portion 25. Thus, disc 57 has a central bore 59 through which extension portion 49 slidably extends and the disc has an outer circular peripheral edge 61 that is contiguous with the inner cylindrical surface 63 of body portion 25. Disc 57 is preferably provided with a hub 65 so that the portion of the disc defining bore 59 has a long contacting surface with extension portion 49 and the disc 57 will remain perpendicular to the extension portion at all times. The hub 65 is preferably integrally formed on the top side of the main body portion 67 of the disc 57. Resilient means, as a coiled compression spring 69 extends between base 29 and the upper surface of disc 57 to urge the disc downwardly towards the lower end of cutting head 23.

Cutting teeth 27 preferably comprise a plurality of inwardly extending teeth 27' alternating with a plurality of outwardly extending teeth 27". Thus, the inwardly extending teeth 27' extend at an angle downwardly and inwardly of the inner cylindrical surface 63 so that the outside diameter of main body portion 67 of disc 57 is greater than the diameter of the imaginary circle along which the ends of the inwardly extending teeth 27' lie. Therefore, it will be seen that the inwardly extending teeth 27' act as a means for limiting the downward movement of disc 57 so that the disc will remain inside of the cutting head 23 but will be adjacent the teeth 27, as seen in FIG. 1, when the teeth 27 begin to cut. It will be understood that the disc 57 can be removed from cutting head 23 by removing extension portion 49 and turning the disc vertically so that it passes between a pair of oppositely disposed outwardly extending teeth 27". To replace disc 57, substantially the reverse of the above-described operation is carried out.

In describing the operation of the cutting head assembly 11 of the present invention, it is illustrated as being used to cut a hole in work piece W of wood. Also, to illustrate further the effectiveness of the cutting head assembly 11 the upper surfaces of the work piece is shown at an angle relative to the longitudinal axis of the cutting head assembly, which would be a difficult cut to make with a conventional hole saw. It will be understood that when the cutting head assembly 11 is brought down onto the work piece W, first the bit portion 55 will engage the work piece and form a bore B therein and then the cutting teeth 27 will engage the work piece as shown in FIG. 1 as at place P. Further, it will be understood that there is no way for the circular lower edge of cutting head 23 or the cutting head itself to distort since the disc 57 prevents such distortion even though the forces are great on the cutting teeth and even though the body portion 25 is elongated and is formed of relatively thin metal. Also, it will be understood that the extension portion 49 with the bit portion 55 serves as a pilot or guide for the cutting head assembly 11. Additionally, it will be understood that as the cutting teeth 27 cut into the work piece W to form the circular cut out portion C, as shown in FIG. 2, the disc 57 will be urged upwardly by the center core O of the work piece, as shown in FIG. 2. Thus, during these phases of the cutting the body portion 25 is being braced by the disc 57. It should be noted also that when a hole is cut completely through a work piece the spring 69 will urge the plug or core out of the cutting head 23.

From the foregoing, it will be understood that the cutting head assembly 11 provides a very effective yet simple means for guiding the cutting head into a work piece and for preventing distortion in the cutting teeth and the cylindrical body portion of the cutting head.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a cutting head assembly of the type adapted to be rotatably driven about its longitudinal axis and comprising a cutting head including a body portion open at the lower end thereof and having a plurality of cutting teeth including some inwardly extending teeth around the lower edge thereof, the improvement in said cutting head assembly comprising a disc having an outer peripheral edge, said disc being movably mounted in said body portion for upward and downward movement relative thereto with said peripheral edge being contiguous to the inner surface of said body portion, means in said cutting head for maintaining said disc perpendicular to the longitudinal axis of said cutting head assembly, at least some of said inwardly extending teeth being positioned to limit downward movement of said disc relative to said body portion, and resilient means in said body portion for urging said disc downwardly towards the lower edge of said body portion.

2. In a cutting head assembly of the type adapted to be rotatably driven about its longitudinal axis and comprising a cutting head including a cylindrical body portion open at the lower end thereof and having a plurality of cutting teeth around the lower circular edge thereof, the improvement in said cutting head assembly comprising a shank extension extending axially of said body portion, a disc having a central bore and an outer circular peripheral edge, said disc being movably mounted in said cylindrical body portion for upward and downward movement relative thereto with said shank extension slidably extending axially through said central bore and with said circular peripheral edge being contiguous to the inner surface of said cylindrical body portion, means limiting downward movement of said disc relative to said body portion, said body portion being of thin metal having a tendency to distort, said peripheral edge of said disc being substantially closer to said body portion than the thickness of the metal of said body portion and being engageable by said body portion for the bracing thereof to prevent distortion thereof, and resilient means in said body portion for urging said disc downwardly towards the lower edge of said body portion.

3. In a cutting head assembly of the type adapted to be rotatably driven about its longitudinal axis and comprising a cutting head including a cylindrical body portion open at the lower end thereof and having a plurality of cutting teeth around the lower circular edge thereof, the inprovement in said cutting head assembly comprising a shank extension extending axially of said body portion, a disc having a central bore and an outer circular peripheral edge, said disc being movably mounted in said cylindrical body portion for upward and downward movement relative thereto with said shank extension slidably extending axially through said central bore and with said circular peripheral edge being contiguous to the inner surface of said cylindrical body portion, means limiting downward movement of said disc relative to said body portion, and resilient means in said body portion for urging said disc downwardly towards the lower edge of said body portion, said means for limiting downward movement including every other one of said teeth extending inwardly of said cylindrical body portion.

4. The structure of claim 2 in which said shank extension includes drill threads adjacent the distal end thereof.

5. A cutting head assembly of the type adapted to be rotatably driven about its longitudinal axis for cutting a work piece, said cutting head assembly comprising a shank extending upwardly along said longitudinal axis and adapted to be received in a chuck or the like for the rotational drive of said cutting head assembly, a flange mounted on said shank with said shank extending axially and perpendicularly thereto, a barrel-shaped cutting head including a hollow cylindrical body portion open at the bottom thereof and provided with a plurality of cutting teeth around the lower circular edge thereof, said barrel-shaped cutting head additionally including a circular base integrally formed at the upper end of said cylindrical body portion and having a central aperture therethrough means detachably coupling said circular base to said flange with said cylindrical body portion and said cutting teeth being concentrically arranged relative to said longitudinal axis, an extension portion of said shank extending from the other portion of said shank centrally and axially through said cylindrical body portion and beyond the lower circular edge thereof to its termination at a distal end, a disc having a central bore and an outer circular peripheral edge, said disc being movably mounted in said cylindrical body portion for upward and downward movement relative thereto with said extension portion of said shank slidably extending axially through said central bore and with said circular peripheral edge being contiguous with the inner surface of said cylindrical body portion, some of said cutting teeth extending inwardly of the inner surface of said cylindrical body portion to limit downward movement of said disc, and resilient means in said barrel-shaped cutting head for urging said disc downwardly toward the lower edge of said cylindrical body portion whereby when the cutting head assembly begins to cut the work piece said disc is adjacent said teeth to brace said teeth and said cylindrical body portion and as the work piece is being cut the work piece moves said disc upwardly.

6. The structure of claim 5 in which said shank extension includes drill threads adjacent the distal end thereof.

7. The structure of claim 5 in which the means detachably coupling said circular base to said flange comprises pin means mounted on said flange and including an enlarged head, said base being provided with substantially key-shaped holes therein each having a narrow part smaller than said head and an enlarged part larger than said head leading therefrom, said pin means respectively engaging said flange in said narrow part of said holes and said holes being arranged so that by turn of said base said heads can be aligned with said enlarged parts of said holes for the removal of said base from said flange.

References Cited

UNITED STATES PATENTS

| 237,242 | 2/1881 | Burns | 144—20 |
| 475,559 | 5/1892 | Heydenreich | 77—69 |
| 2,754,864 | 7/1956 | Elsy | 145—120 |
| 2,779,361 | 1/1957 | McKiff | 77—69 |
| 2,852,967 | 9/1958 | Mueller et al. | 77—69 |
| 3,265,104 | 8/1966 | Gallo | 145—120 |

FOREIGN PATENTS 904,860   3/1945   France.

FRANCIS S. HUSAR, *Primary Examiner.*